(12) United States Patent
Riesterer

(10) Patent No.: US 7,856,755 B2
(45) Date of Patent: Dec. 28, 2010

(54) GARDEN OR PLANTER SYSTEM WITH ELEVATED BED AND WATER RESERVOIR

(76) Inventor: Donald L. Riesterer, 8301 Creekside Cir., Suite 101, Bloomington, MN (US) 55437

( * ) Notice: Subject to any disclaimer, the term of this patent is extended or adjusted under 35 U.S.C. 154(b) by 209 days.

(21) Appl. No.: 12/157,715

(22) Filed: Jun. 12, 2008

(65) Prior Publication Data

US 2009/0031629 A1 Feb. 5, 2009

Related U.S. Application Data

(60) Provisional application No. 60/934,194, filed on Jun. 12, 2007.

(51) Int. Cl.
*A01G 25/00* (2006.01)
(52) U.S. Cl. .......................................................... 47/79
(58) Field of Classification Search ...................... 47/79
See application file for complete search history.

(56) References Cited

U.S. PATENT DOCUMENTS

| | | | | |
|---|---|---|---|---|
| 283,966 | A * | 8/1883 | Chappell | 47/79 |
| 3,451,162 | A * | 6/1969 | Rasmussen | 47/62 E |
| 3,906,667 | A * | 9/1975 | Williams | 47/79 |
| 4,052,818 | A * | 10/1977 | Hagerty | 47/81 |
| 4,236,352 | A * | 12/1980 | Heaney et al. | 47/80 |
| 4,962,613 | A * | 10/1990 | Nalbandian | 47/79 |
| 5,103,584 | A | 4/1992 | Whisenant | |
| 5,193,306 | A | 3/1993 | Whisenant | |
| 5,379,547 | A | 1/1995 | Whisenant | |
| 5,426,889 | A * | 6/1995 | Buora | 47/79 |
| 5,524,387 | A | 6/1996 | Whisenant | |
| 5,535,542 | A * | 7/1996 | Gardner et al. | 47/18 |
| 5,555,675 | A | 9/1996 | Whisenant | |
| 5,852,895 | A | 12/1998 | Sinanan | |
| 5,918,415 | A * | 7/1999 | Locke et al. | 47/79 |
| 5,921,025 | A * | 7/1999 | Smith | 47/79 |
| 6,205,706 | B1* | 3/2001 | Buss | 47/48.5 |
| 6,226,921 | B1* | 5/2001 | Kang | 47/81 |
| 6,237,283 | B1* | 5/2001 | Nalbandian et al. | 47/48.5 |
| 6,698,136 | B1 | 3/2004 | Cleveland | |
| 6,874,278 | B2 | 4/2005 | Felknor et al. | |
| 7,000,351 | B2* | 2/2006 | Baumann | 47/80 |
| 2002/0073615 | A1 | 6/2002 | Johnson et al. | |
| 2005/0120625 | A1 | 6/2005 | Appel | |
| 2007/0180766 | A1 | 8/2007 | Wilkes | |
| 2009/0031629 | A1* | 2/2009 | Riesterer | 47/66.7 |

OTHER PUBLICATIONS

Earthbox Ordering Brochure, 5 pages, 2006.

* cited by examiner

*Primary Examiner*—Francis T Palo
(74) *Attorney, Agent, or Firm*—Kagan Binder, PLLC

(57) ABSTRACT

Described is a planter system, comprising: at least one water retaining vessel; a bedding material layer disposed above the at least one water retaining vessel; a structure surrounding the at least one water retaining vessel and the bedding material layer; and at least one fill tube extending from above the bedding material layer, through the bedding material layer, and into the at least one water retaining vessel, through which water is supplied to the at least one water retaining vessel to a predetermined level. Also, a method of making such a planter system having an elevated bedding material layer.

12 Claims, 3 Drawing Sheets

GARDEN OR PLANTER SYSTEM WITH ELEVATED BED AND WATER RESERVOIR

CROSS-REFERENCE TO RELATED APPLICATION

The present application claims priority to U.S. Provisional Application No. 60/934,194, filed Jun. 12, 2007, and titled "Garden or Planter System with Elevated Bed and Water Reservoir," the entire contents of which are incorporated herein by reference in their entirety.

TECHNICAL FIELD

The present invention generally relates to gardening devices, and, more particularly, to a garden or planter system that supports an elevated bed for plants and provides water storage below the bed while permitting water filling to a predetermined level from above the bed.

BACKGROUND OF THE PRESENT INVENTION

Gardening is an activity enjoyed by many people. It is also an activity that traditionally requires certain physical demands from the gardener, including crawling, squatting, and kneeling in the garden. In general, the gardener must be able to physically roam through the garden, often on all fours, in order to properly perform most gardening tasks. For those who enjoy gardening, the onset of a physical disability or the effects of aging may prevent the person from being able to handle the physical requirements of gardening.

Gardening is traditionally done outdoors. In some geographical areas, it is impossible to grow certain plants outdoors due to climate and/or soil conditions.

Gardening generally requires a significant amount of space. In urban areas, for example, where space is limited, it may not be possible to have a garden.

A solution to the above issues regarding gardening is to use a container garden, which is a container of some type in which plants, flowers, shrubs, fruits and/or vegetables are grown. Containers allow you to enjoy plants in areas where a traditional garden is awkward or impossible. Some examples of where container gardens are used include small backyards, on apartment patios, inside homes, on rooftops, on decks, on balconies, on the grounds of hospitals and retirement homes, around shopping malls, and along streets adjacent buildings. Such a container garden makes it easier for a disabled or older gardener to reach the planting area. In addition, container gardens may also be located indoors and in tight spaces, allowing certain plants to be grown in otherwise impossible places.

Despite the benefits of container gardening, an issue with using a container to grow plants is that the container may only hold a certain amount of water at a time, which may not be enough for certain plants in the container. Such a container may require frequent watering. Conversely, the container may not allow excess water to drain, which is an issue for plants requiring less moisture. Also, containers are usually small in size and designed to be portable, and may contain only one plant or very few plants.

SUMMARY OF THE PRESENT INVENTION

The present invention provides certain advantages over prior garden or planter systems or devices. One advantage of the present invention is the planter system includes a bed for planting that is elevated to a desired height, allowing a person to garden without having to bend, stoop or kneel. Yet another advantage is that the system includes at least one water retaining vessel (i.e., reservoir, or storage area) under the bed that stores water and provides water to plants in the bed over an extended period of time. Thus, the system of the present invention does not require frequent watering. A further advantage is that the planter system includes a fill tube by which to easily fill the at least one water retaining vessel that extends out from the top of the system, or above the bed. In addition, filling water retaining vessels through the fill tubes eliminates the need to pour water directly onto the top surface of the bed that preferably comprises a dirt mixture, which could cause dirt to splash onto nearby items. Further, at least one drain pipe may be provided in communication with the at least one water retaining vessel, which allows for the water retaining vessel to be drained as desired for cleaning purposes, for example. Additionally, the system includes at least one weeping hole in communication with the upper portion of the at least one water retaining vessel through which excess water may flow out of the system. Therefore, the system is able to hold a desired or predetermined amount of water, without an excess of water being retained. Still another advantage of the planter system is that it is modifiable, such that it may be enlarged in size to accommodate more plants, for example.

One aspect of the present invention is a planter system. One embodiment of the planter system comprises: at least one water retaining vessel; a bedding material layer disposed above the at least one water retaining vessel; a structure surrounding the at least one water retaining vessel and the bedding material layer; and at least one fill tube extending from above the bedding material layer, through the bedding material layer, and into the at least one water retaining vessel, through which water is supplied to the at least one water retaining vessel to a predetermined level. The planter system may further comprise at least one weep hole through the structure and in communication with the at least one water retaining vessel, wherein water supplied to the at least one water retaining vessel in excess of the predetermined level is able to flow out of the system. The planter system may further comprise a grate disposed between the bedding material layer and the at least one water retaining vessel in order to prevent bedding material from entering the at least one water retaining vessel while allowing water to enter the bedding material layer. The planter system may further comprise a support layer disposed below the at least one water retaining vessel, on order to support the at least one water retaining vessel. The structure may surround at least portion of the support layer. The bedding material layer may comprise first and second layers, wherein the first layer comprises a material to support the second layer and the second layer comprises a dirt mixture and is disposed above the first layer. The at least one water retaining vessel may comprise a drain through the structure and in communication with the at least one water retaining vessel, in order to drain water out of the at least one water retaining vessel and out of the system.

A second embodiment of the planter system comprises: a support layer; at least one water retaining vessel disposed above at least a portion of the support layer; a grate disposed above the at least one water retaining vessel and the support layer; a bedding material layer disposed above the grate; at least one fill tube extending between from above the bedding material layer to within each of the at least one water retaining vessels, through which water is supplied to the at least one water retaining vessel to a predetermined level; and a structure surrounding the support layer, the at least one water retaining vessel, the grate, and the bedding material layer. The planter system may further comprise at least one weep hole through the structure and in communication with the at least one water retaining vessel, wherein water supplied to the at least one water retaining vessel in excess of the predetermined level is able to flow out of the system. The bedding material layer may comprise first and second layers, wherein the first layer comprises a material to support the second layer and the second layer comprises a dirt mixture and is disposed above the first layer. The at least one water retaining vessel may comprise a drain through the structure and in communication with the at least one water retaining vessel, in order to drain water out of the at least one water retaining vessel and out of the system.

A second aspect of the present invention is a method of making a planter system having an elevated bedding material layer. One embodiment of the method comprises the steps of: providing a structure comprising a plurality of sidewalls, a top portion and a bottom portion, wherein the sidewalls form an interior space, and the top portion is open; positioning the structure on the ground; providing a support material in the interior space; placing at least one water retaining vessel in the interior space above the support material; inserting a grate in the interior space that is disposed above the at least one water retaining vessel, wherein the grate comprises openings allowing water to pass there through; providing a bedding material that is disposed above the grate, wherein the grate prevents the bedding material from entering the at least one water retaining vessel and the bedding material allows water to move through and plants to grow therein; and positioning at least one fill tube such that the at least one fill tube extends from the open top portion of the structure, through the bedding material and the grate and into the at least one water retaining vessel, such that water may be added to the at least one water retaining vessel through the fill tube from above the top portion. The bottom of the structure may be open. The method may further comprise, before the positioning the structure on the ground step, the steps of: digging a trench in the ground; and filling the trench with a support material; and wherein, in the positioning the structure on the ground step, the structure is positioned over the trench in the ground. The method may further comprise the step of forming at least one weep hole through the structure and in communication with the at least one water retaining vessel, wherein water supplied to the at least one water retaining vessel in excess of a predetermined level is able to flow out of the system. The bedding material layer may comprise first and second layers, wherein the first layer comprises a material to support the second layer and the second layer comprises a dirt mixture and is disposed above the first layer. The method may further comprise the step of forming at least one drain hole through the structure, wherein the at least one water retaining vessel is in communication with the at least one of the drain hole, in order to allow water to be drained out of the at least one water retaining vessel and out of the system. The support material may be provided having a certain depth in order to elevate the bedding material layer to a predetermined height. The method may further comprise the step of modifying the structure in order to change the size or shape of the interior space.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF PREFERRED EMBODIMENTS OF THE PRESENT INVENTION

With reference to the accompanying figures, wherein like components are labeled with like numerals throughout the several figures, garden or planter systems or devices, are disclosed, taught and suggested by the multiple embodiments. The present invention particularly relates to a garden or planter system that supports an elevated bed for plants and provides water storage below the bed while permitting water filling to a predetermined level from above the bed. Also, the present invention relates to a modular system for providing such an elevated bed at any ground location and of any size.

Figure 1:
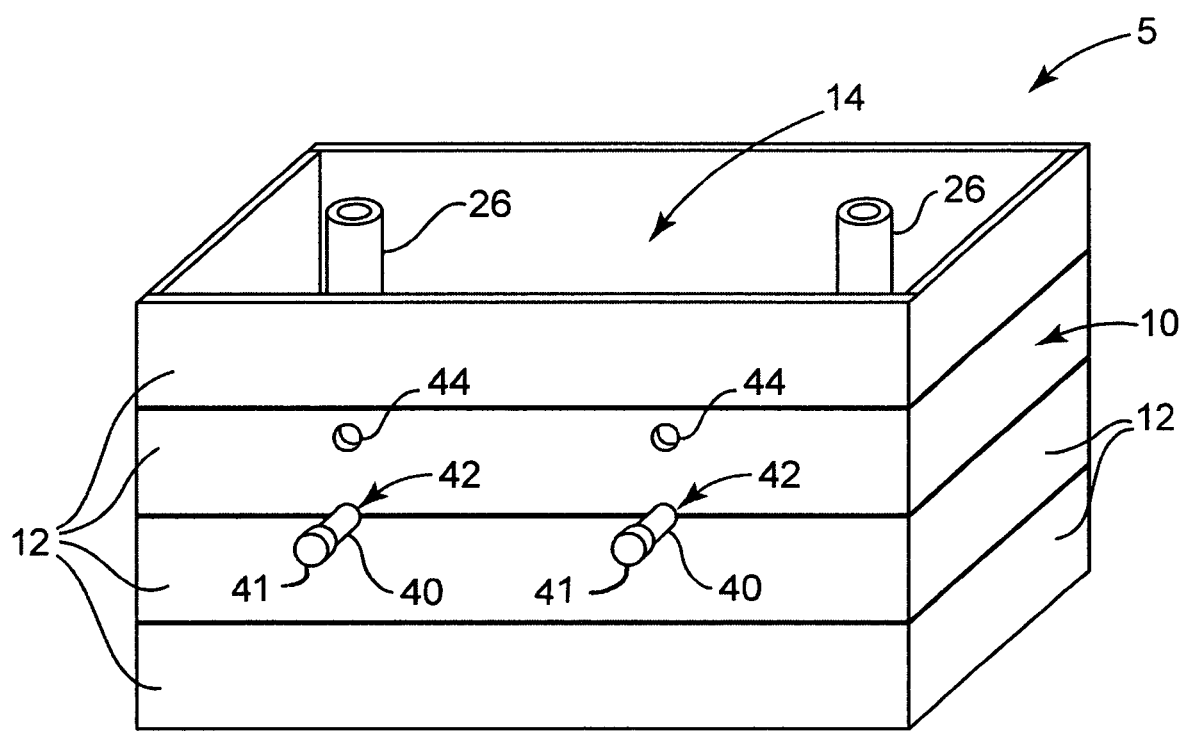
FIG. 1 is a perspective view of an embodiment of a planter system, in accordance with the present invention.
Figure 2:
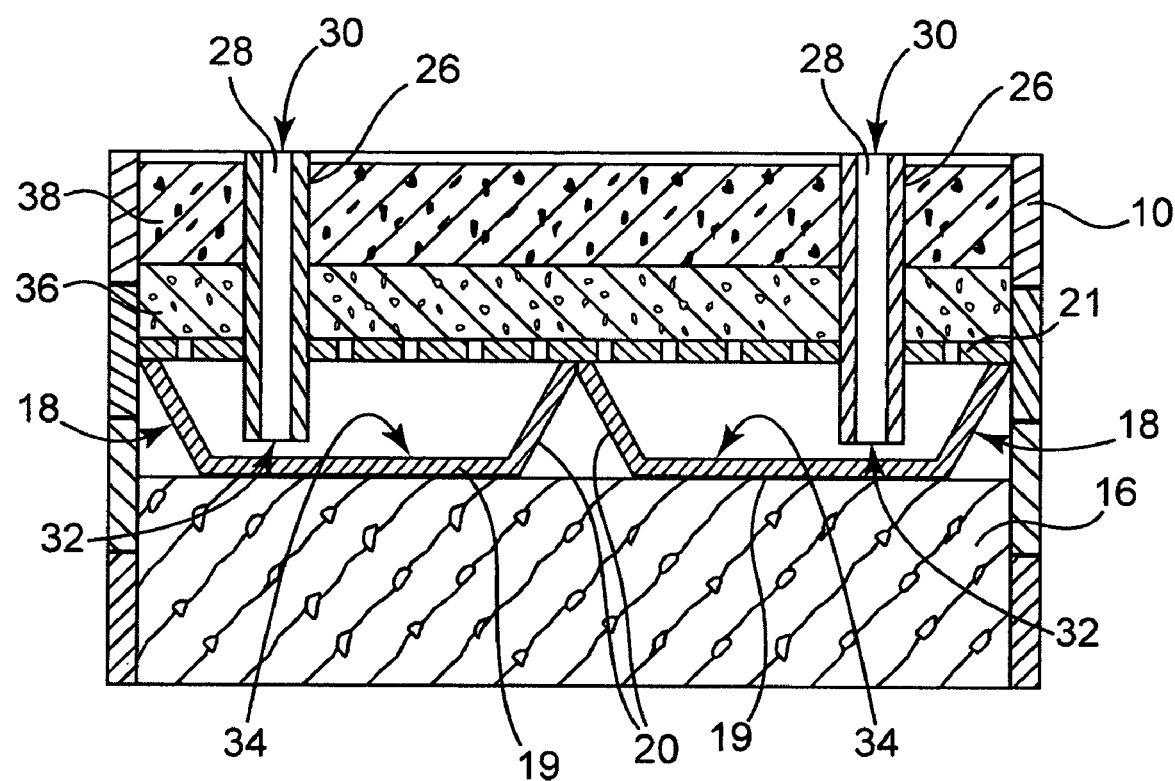
FIG. 2 is a cross-sectional view of the planter system of FIG. 1.
Figure 3:
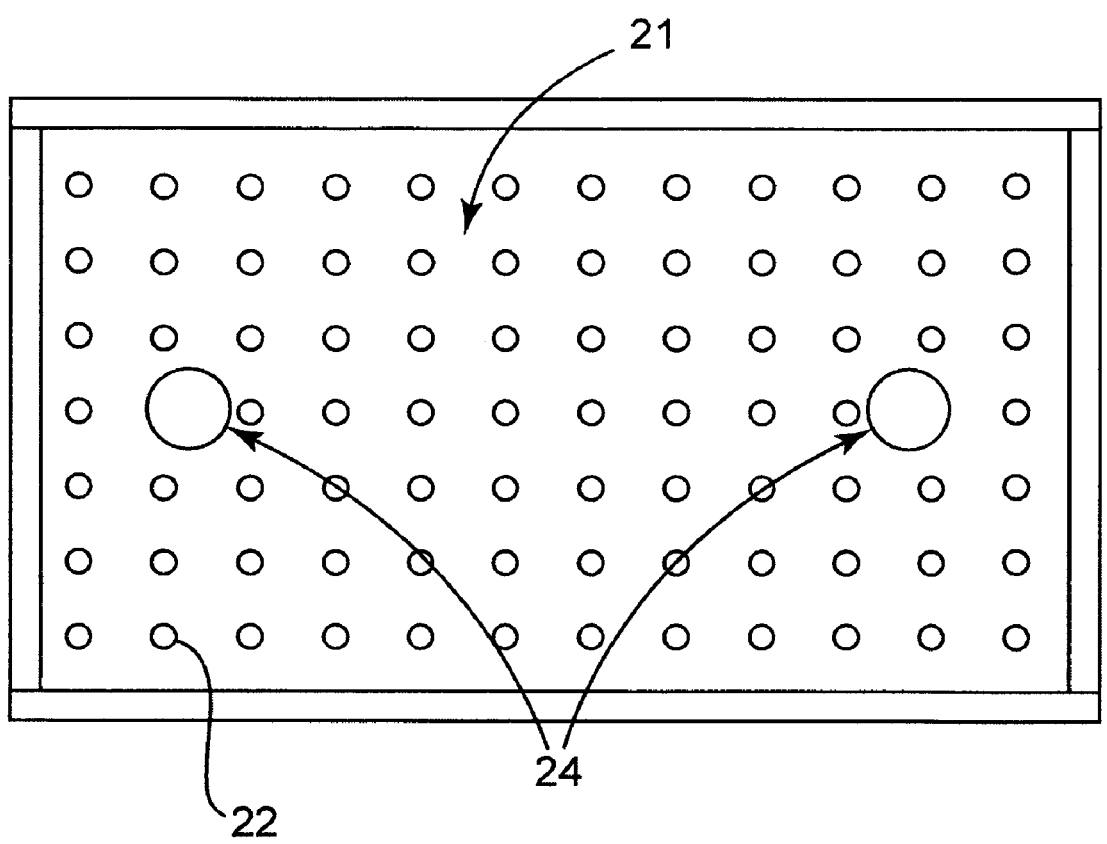
FIG. 3 is a top view of a grate portion of the planter system of FIG. 1.

With reference to FIGS. 1-3, one embodiment of a planter system 5 in accordance with the present invention is illustrated, and is described as follows. In particular, FIG. 1 shows the system 5 preferably comprising a box-shaped bed structure 10, with four sides. The structure 10 is illustrated as preferably comprising multiple planks 12 assembled together. Planks 12 can be made of wood, plastic, metal or other materials as may be shaped by known techniques including forming, such as by injection molding with plastics, or by cutting into size, or the like. In order to assemble planks 12 together to create structure 10, any conventional brackets, angle iron, or other known or developed connectors, nails, bolts and screws, or the like, can be used. Alternatively, however, the structure 10 may comprise an integrated structure. Any other components assembly is also contemplated with the basic purpose being to create a multi-sided barrier that is closed about any shaped interior space volume.

Structure 10 is preferably sized and shaped to accommodate a garden of a certain desired size and shape or to fit into a certain area. Structure 10 also preferably creates an interior space 14 within which other components of the system 5 (discussed below) can be provided. Structure 10 preferably also includes apertures (discussed below) in order to allow access to the other components of the system 5 (also discussed below) as necessary.

FIG. 2 is a cross-sectional view of system 5. As shown, the structure 10 has a rectangular-shaped cross-section. Other cross-sectional shapes of the system 5 of the present invention, however, are contemplated by the present invention.

The system 5, as shown, further comprises a support layer 16 that is preferably provided within interior space 14. The support layer 16 shown may comprise gravel, for example, cement blocks, or any other material that preferably provides a solid support to other components and allows the other components disposed thereon to be elevated to a desired height. The support layer 16 may also be partially buried within supporting ground (not shown) onto which system 5 is provided. Also, such a support layer may not be provided at all depending on height or other system designs.

Disposed above and adjacent the support layer 16 in interior space 14 is one or more water retaining vessels 18 (two are shown in FIG. 2). The water retaining vessels 18 contain a bottom 19 and sides 20 that retain a quantity of water therein. The purpose of the water retaining vessels 18 is to provide, store and retain water for plants planted in system 5. The term "water" as used herein includes pure water or mixtures of water with other fluids or components.

Water retaining vessels 18 can be of a commercially type that is available in any size and shape, or the vessel 18 may be customized in construction to fit any structure 10. As shown in FIG. 2, two similar water retaining vessels 18 are arranged adjacent one another and both supported by support layer 16 within interior space 14 of system 5.

Disposed above and adjacent the water retaining vessels 18, is a grate or screen layer 21, which is preferably provided to keep bedding material (e.g., dirt, etc.) located above, as illustrated in FIG. 2, from falling into the water retaining vessels 18. The grate 21 may be comprised of any suitable material, such as including metals, plastics, wood, and the like. Preferably, the grate 21 comprises a load bearing material of sufficient rigidity to withstand the forces from the bedding material being supported thereon. The grate 21 can have any number and size of openings 22 that are suitable for the purpose of preventing bedding material from falling into the water retaining vessels 18, while allowing water (as vapor or liquid) to move through to bedding material and any plants located above. FIG. 3 shows a top view of an exemplary grate 21 of the present system 5. The exemplary grate 21 is illustrated with a pattern of circular openings 22. Other patterns, sizes and shapes of openings, however, are also contemplated. Alternatively, openings can be such as provided by a screen comprising longitudinal and transverse elements, for example.

Preferably, fill tube openings 24 (FIG. 3) are also provided in grate 21 to permit fill tubes 26 to extend there through. There are two such openings 24 for two fill tubes 26 in the illustrated embodiment, although different numbers of openings 24 for different numbers of fill tubes 26 are contemplated by the present invention. Preferably, there is at least one fill tube 26 supplied to each water retaining vessel 18 in the system 5, so there will be at least one fill tube opening 24 in the grate 21.

The fill tubes 26, as shown, are generally tubular in shape and comprise a lumen 28 running there through with first and second open ends 30, 32 (respectively) (FIG. 2). The purpose of the fill tubes 26 is to allow water to be added to the water retaining vessels 18 preferably from outside the structure 10, and most preferably from above the system 5. The first open end 30 of each fill tube 26 preferably extends to at least near the top of the structure 10, which allows the fill tube 26 to be accessible above the structure 10 in order to permit water to be added through fill tube 26 and flow through the lumen 28 to the associated water retaining vessel 18. The second open end 32 of each fill tube 26 is preferably supported such that it is spaced at least slightly away from the bottom surface 34 of the water retaining vessel 18, in order to allow water to flow into the water retaining vessel 18. Alternatively, the fill tubes 26 may sit on the bottom of vessels 18 and can include an opening through the side through which water can flow into the vessels 18. Most preferably, the fill tubes 26 are of a diameter to permit easy filling with a conventional watering hose.

The fill tubes 26 are preferably arranged such that the lumen 28 extends generally in a vertical direction in order to allow gravity to move water through the lumen 28 and into associated water retaining vessel 18. The fill tubes 26 may preferably be supported in the vertical direction by the openings 24 through the grate 21 along with any bedding material surrounding the fill tubes 26 located above the grate 21. Fill tubes 26 may otherwise be at an angle, but preferably with a vertical component so as to flow under gravity.

Bedding material is preferably disposed above grate 21 and preferably in first and second bedding material layers 36, 38, as shown in FIG. 2. Preferably, the first bedding material layer 36 is disposed above and adjacent to grate 21 and supports the second bedding material layer 38, which preferably comprises a dirt mixture or the like for planting purposes. The second bedding material layer 38 is preferably disposed above and adjacent the first bedding material layer 36. First bedding material layer 36 preferably comprises peat moss, straw, or the like, or may comprise an artificial material that functions in a similar manner, i.e. to support a dirt mixture in second bedding material layer 38. The first bedding material 36 preferably also substantially keeps the second bedding material layer 38 from falling into water retaining vessels 18, as such may be able to pass through openings 22 of the grate 21. First bedding material layer 36 preferably also permits moisture to pass through from the water retaining vessels 18 to the second bedding material layer 38.

Advantageously, in the present invention, the second bedding material layer 38 can be elevated to a level that is easy for gardening without kneeling, stooping or bending, as such elevation can be easily customized based upon the above described construction techniques of system 5. Preferably, the second bedding material layer 38 is supported at about four feet of elevation from the ground for this purpose. Variations of elevation can be made not only in the construction of the system 5, but also by controlling the level or depth of the support layer 16 within the interior 14 of the structure 10 or by the depth of other layers or elements.

As shown in FIG. 1, drains 40 are preferably provided through apertures 42 in the structure 10 in order to allow fluid communication between the water retaining vessels 18 and the exterior of structure 10. Preferably, one drain 40 is associated with each water retaining vessel 18 in system 5. Drains 40 preferably allow the water retaining vessels 18 to be drained completely, such as for cleaning or seasonal preparation. In normal operation, the drains 40 would be kept closed. Accordingly, drains 40 include means for controllably opening and closing the drains 40 to the exterior of structure 10. Drains 40 as illustrated may include caps 41 that are fitted over the ends of the drains 40 opposite where they extend into water retaining vessels 18. The caps 41 can be friction fit or screwed on or the like. Alternatively, the cap 41 can be provided with a drain valve, as are well known.

Drains 40 may comprise conventional polyvinylchloride (PVC) pipe provided through apertures 42 in structure 10 and into water retaining vessels 18 near their bottom surface 34. Alternatively, such drains 24 may be incorporated with the water retaining vessels 18, as such vessels 18 are commercially available (e.g., livestock watering tanks).

Optionally, in order to set a maximum water level within water retaining vessels 18, weep holes 44, as shown in FIG. 1, may be provided through structure 10, and preferably above drains 40. Such weep holes 44 communicate with water retaining vessels 18 preferably adjacent their top edge, or any point below where water flow from vessel(s) 18 can be limited. Weep holes 44 may alternatively be accommodated with PVC pipes, for example, if needed to allow excess water in the system 5 to flow to the exterior of structure 10.

When water is added to a water retaining vessel 18 through fill tube 26, the associated drain 40 is closed. Once the water level reaches a desired or predetermined level, water flows from the weep holes 44 as an indication and water leveling feature. The water retaining vessels 18 are preferably replenished with water at periodic intervals.

The shape of the system 5 can vary, with examples being rectangular, square, oval, rounded or sharp-cornered shapes. The shape can vary as may be appropriate for a particular architectural effect or location.

Any size of planter system 5 can be designed using the above concepts by utilizing, for example, any number of components, such as the water retaining vessels 18, fill tubes 26, or drains 40, and using any number of grates 21. The dimensions of the components may also vary. In addition, the support layer 16 may vary in height. The structure 10 can be designed having any size with simple construction techniques, such as those described in the Example below.

Also, the planter system size can be modified after construction, simply by enlarging or changing the shape of the structure 10. The size and shape of the interior space may therefore be modified to accommodate different numbers of plants, for example. One way of enlarging the structure 10 is to add additional structure to a portion of the structure 10, which may necessitate opening the structure 10. Other modifications of the system are also contemplated by the present invention.

In accordance with the present invention, a planter system is provided that is built into existing terrain, such as within a residential yard, or the system can be incorporated within a building construction and provided inside or outside of any such building structure. Planters in accordance with the present invention can be integrated within other landscaping and provides a substantially permanent structure as can be used year after year and can be changed or modified as desired.

EXAMPLE

One example of assembling a planter system, in accordance with the present invention, is provided as follows.

In order to assemble the exemplary system, first, a 8 feet (2.44 m) by 4 feet (1.22 m) trench is dug in the ground having a depth of about 6 inches (0.15 m). Six inches (0.15 m) of gravel is then added to fill the trench.

A box-shaped bed structure of the system is formed from twelve planks of treated wood, each having a length of 8 feet (2.44 m) and a width of 1 foot (0.30 m). To form the structure, first four of the twelve planks are cut in half to form eight planks with a length of 4 feet (1.22 m) each. The planks are then assembled using bolts to form the structure having the dimensions of 8 feet (2.44 m) in length by 4 feet (1.22 m) in width by 4 feet (1.22 m) in height. The structure is then placed on the ground such that the structure surrounds the trench.

On one 8 foot (2.44 m) long side of the structure, and between the second and third (out of four) planks, drain holes are drilled. Above the drain holes, weep holes are drilled. Pieces of one-quarter inch PVC pipe are then placed in the weep holes, to allow overflow of water in the system to flow to the exterior of the structure.

Next, in the interior of the structure, 12 inches (0.30 m) of gravel are added above the 6 inches (0.15 m) already in the trench. Two water-retaining tanks are then placed in the interior on top of the 12 inches (0.30 m) of gravel. The water retaining vessel are livestock water tanks that are conventionally known and commercially available having a length of 4 feet (1.22 m) and including drain pipes. The water retaining vessels are lengthwise placed in the interior of the structure and extend across the 4 feet (1.22 m) width of the structure. The vessels are placed such that the drain pipes extend through the drain holes drilled through the structure. The weep holes drilled in the structure generally lined up with the upper portions of the two water retaining vessels.

A grate is then disposed above the water retaining vessels in the interior of the structure. The grate measures about 4 feet (1.22 m) by 8 feet (2.44 m). The grate includes two apertures to allow two fill tubes (one for each vessel) to extend there through. The two fill tubes are then inserted through the holes in the grate, and extending into the water retaining vessels.

A first bedding material layer comprising straw or peat moss is then layered on top of the grate and around the fill tubes. A second bedding material layer comprising manure and black dirt is then added on top of the first bedding material layer and around the fill tubes. The two fill tubes extend through the first and second bedding material layers such that the fill tubes are accessible above the system.

In order to grow plants in the described system, seeds are planted in the second bedding material layer. Water is then added to the vessels through the fill tubes about once a week, or as necessary.

The present invention has now been described with reference to embodiments thereof. The foregoing detailed description and example have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

The invention claimed is:

1. A planter system, comprising:
   a structure defining a shaped interior volume for a planter;
   a support layer of material contained within the shaped interior volume of the structure;
   at least one water retaining vessel providing an open water reservoir that is disposed above and supported by the support layer;
   a grate disposed above and covering the open water reservoir of the water retaining vessel so as to substantially prevent a bedding material layer that is disposed above the grate from falling into the water retaining vessel, the grate permitting water vapor to enter the bedding material from below; and
   at least one fill tube extending from above the bedding material layer, through the bedding material layer, and into the at least one water retaining vessel, through which water is supplied to the at least one water retaining vessel to a predetermined level.

2. The planter system of claim 1, further comprising at least one weep hole through the structure and in communication with the at least one water retaining vessel, wherein water supplied to the at least one water retaining vessel in excess of the predetermined level is able to flow from the shaped interior volume through the structure and out of the system.

3. The planter system of claim 1, wherein the bedding material layer comprises first and second layers, wherein the first layer comprises a material to support the second layer and the second layer comprises a dirt mixture and is disposed above the first layer.

4. The planter system of claim 1, wherein the at least one water retaining vessel comprises a drain through the structure and in communication with the at least one water retaining vessel, in order to drain water out of the at least one water retaining vessel and out of the system.

5. A method of making a planter system having an elevated bedding material layer, comprising the steps of:
   providing a structure comprising a plurality of sidewalls, a top portion and a bottom portion, wherein the sidewalls form an interior space, and the top portion is open;
   positioning the structure on the ground;
   providing a support material in the interior space;

placing at least one water retaining vessel providing an open water reservoir in the interior space above the support material;

inserting a grate in the interior space that is disposed above the at least one water retaining vessel, wherein the grate comprises openings allowing water vapor to pass there through;

providing a bedding material that is disposed above the grate, wherein the grate prevents the bedding material from entering the at least one water retaining vessel and the bedding material allows the water vapor to move through its openings to provide water within the bedding material for plants to grow therein; and positioning at least one fill tube such that the at least one fill tube extends from the open top portion of the structure, through the bedding material and the grate and into the at least one water retaining vessel, such that water may be added to the at least one water retaining vessel through the fill tube from above the top portion.

6. The method of claim 5, wherein the bottom of the structure is open.

7. The method of claim 6, further comprising, before the positioning of the structure on the ground step, the steps of:
digging a trench in the ground; and
filling the trench with a support material; and wherein, in the positioning the structure on the ground step, the structure is positioned over the trench in the ground.

8. The method of claim 5, further comprising the step of forming at least one weep hole through the structure and in communication with the at least one water retaining vessel, wherein water supplied to the at least one water retaining vessel in excess of a predetermined level is able to flow out of the system.

9. The method of claim 5, wherein the bedding material layer comprises first and second layers, wherein the first layer comprises a material to support the second layer and the second layer comprises a dirt mixture and is disposed above the first layer.

10. The method of claim 5, further comprising the step of forming at least one drain hole through the structure, wherein the at least one water retaining vessel is in communication with the at least one of the drain hole, in order to allow water to be drained out of the at least one water retaining vessel and out of the system.

11. The method of claim 5, wherein the support material is provided having a certain depth in order to elevate the bedding material layer to a predetermined height.

12. The method of claim 5, further comprising the step of modifying the structure in order to change the size or shape of the interior space.

* * * * *